United States Patent [19]

Müller et al.

[11] Patent Number: 5,085,701
[45] Date of Patent: Feb. 4, 1992

[54] POLYMER-MODIFIED BITUMEN (PMB)

[75] Inventors: Michael Müller, Alsbach-Hähnlein; Horst Pennewiss, Darmstadt-New-Kranichstein; Juergen Gebhardt, Schaafheim, all of Fed. Rep. of Germany

[73] Assignee: Röhm GmbH Chemische Fabrik, Darmstadt, Fed. Rep. of Germany

[21] Appl. No.: 531,584

[22] Filed: Jun. 1, 1990

[30] Foreign Application Priority Data

Jun. 1, 1989 [DE] Fed. Rep. of Germany ....... 3917815

[51] Int. Cl.$^5$ .................... C08L 95/00; C09D 4/00; C09D 101/00; C09D 201/00
[52] U.S. Cl. .................... 106/273.1; 106/277; 106/284.4; 106/668; 106/671; 106/823
[58] Field of Search .............. 106/273.1, 277, 668, 106/671, 819, 823, 284.4

[56] References Cited

U.S. PATENT DOCUMENTS

| | | | |
|---|---|---|---|
| 2,420,082 | 5/1947 | Klinger | 260/28 |
| 2,848,429 | 8/1958 | Woodruff et al. | 260/4 |

FOREIGN PATENT DOCUMENTS

| | | |
|---|---|---|
| 1240773 | 5/1967 | Fed. Rep. of Germany . |
| 1177425 | 1/1970 | United Kingdom . |
| 8807067 | 9/1988 | World Int. Prop. O. . |

OTHER PUBLICATIONS

Ger. AS 12 40 773 = CA 67:66364m.
Ger. OS 23 31 727 (Has No English Equivalent).
Ger. OS 25 09 473 = CA 86:92998h.
Jap. OS 52-141829 = CA 89:48110a.
PCT [OS] 88/07067.

*Primary Examiner*—Mark L. Bell
*Assistant Examiner*—Michael A. Marcheschi
*Attorney, Agent, or Firm*—Oblon, Spivak, McClelland, Maier & Neustadt

[57] ABSTRACT

A polymer-modified bitumen (PmB) having improved elastic restoration prepared by blending from 0.5-20 wt. % of a polymer material in bitumen, said polymer additive, which may be comprised of various polymers, being comprised of from 20-100 wt. % of a polyalkyl (meth)acrylate comprising monomer units as follows:

50-100 wt. % of alkyl (meth)acrylates containing alkyl groups of 8-26 C atoms;
0-30 wt. % of alkyl (meth)acrylates containing alkyl groups of 1-7 C atoms; and
0-20 wt. % of other monomers, optionally containing functional groups;

and said polymer having a molecular weight $M_w > 1,000,000$, corresponding to a viscosity number $\eta_{sp}/c > 120$ ml/g as measured in chloroform at 20° C.

6 Claims, No Drawings

POLYMER-MODIFIED BITUMEN (PMB)

BACKGROUND OF THE INVENTION

1. Field of the Invention

The present invention relates to polymers based on polyalkyl (meth)acrylates, for use as bitumen improving agents; and to bitumen modified with such polymers and having improved engineering properties.

2. Description of the Background

Bitumen, which is a mixture of essentially different hydrocarbons and which contains varying amounts of paraffinic, naphthenic, and aromatic hydrocarbons, has properties which make it useful in a number of applications including its use as a component in road surfaces, its use as a sealing compound, its use as a coating material, its use in the preparation of tar paper and the like. It can also be used to protect building structures, and as a caulking or waterproofing material or the like, to protect against ground water.

Bitumen generally has little or no elasticity. Because of its inherent properties, coatings or pavement layers comprised of bitumen are brittle at low temperatures and soft at higher temperatures.

Attempts have been made to use various additives, particularly polymers, to improve bitumen, particularly to improve its rheological properties such that, e.g., if an asphalt is prepared from a mixture of polymer, bitumen and minerals and then used as a roadbuilding material, the resulting prepared roadbed has sufficient stability and cold flexibility, as well as high fatigue strength under constantly increasing traffic loads. Polymer addition can increase the so-called plasticity range, i.e., the difference between the softening point and the failure point. If the failure point (DIN 52 012) is lowered and the ductility (DIN 52 013) is increased, improvement of the cold flexibility is indicated. The objective of using polymers as bitumen additives is to alter the viscoelastic properties of bitumen, in particular to extend the plasticity range and to improve the elastic restoration.

In addition to natural and synthetic rubbers, other polymers which have been tested as bitumen improvers are duroplastic resins and thermoplastic resins (Koerner et al, 1977 *Plaste und Kautschuk*, 24, 475-478). Principal polymers currently used as bitumen additives are styrene/butadiene copolymers (SB), EPDM copolymers, ethylene/vinyl acetate copolymers (EVA), and atactic polypropylene, the latter being used particularly for industrial bitumen. Polymer-modified bitumens available commercially include Carabit ® (SB, supplied by Shell), Olexobit ® (EPDM, supplied by BP), and Styrelf ® (SB, supplied by Elf).

Other known bitumen improvers are polymers based on (meth)acrylic acid esters, particularly polymers of alkylmethacrylic acid esters (PAMAs). These polymers are still limited in their applicability, despite the fact that they satisfy a number of criteria as additives. The principal drawback which they have is that they do not sufficiently improve the elastic restoration of the finished elastomer-modified bitumen.

U.S. Pat. No. 2,420,082 describes bituminiferous mixtures comprised of bitumen and 2-5% of polyalkyl methacrylates wherein the alkyl group has 8-10 C atoms. The ductility of the bitumen is improved. Specific data on the molecular weights are not given.

Also, U.S. Pat. No. 2,848,429 describes bituminiferous mixtures with improved ductility, obtained by addition of rubber and polyalkyl (meth)acrylates, each in the amount of 0.01-0.5%. The PAMAs have molecular weights of 5,000-500,000.

Ger. AS 12 40 773 and OS 23 31 727 also describe improved bitumeniferous binders for road surfacing, which contain alkyl methacrylate polymers. No detailed or specific information about the polymers is given.

Polyalkyl (meth)acrylates and copolymers of alkyl (meth)acrylates have also been proposed as improvers for bitumen. The polymer described in Ger. OS 25 09 473 is a solid mixed polymer with molecular weights of 50,000-500,000. In Jap. OS 52-141,829, stagewise emulsion polymerized additives are described, and in PCT 88/07 067, polyalkyl methacrylates wherein the alkyl groups have 4-20 C atoms and having molecular weights of c. 5,000-1,000,000 are described which are contained in amounts of 0.01 to c. 10 wt. % in the modified bitumen.

Criteria which polymer candidates as additives should possess if they are to improve the properties of bitumeniferous mixtures are oxidation resistance, thermal stability, ease of incorporation into bitumen, compatibility with different types of bitumen, and stability of the resultant bitumen-polymer mixture.

Known polymeric bitumen additives adequately improve cold flexibility in bitumeniferous mixtures and resulting mineral mixtures. Thus, the failure point and ductility of such materials are favorably affected by addition of known additives. However, the fatigue strength and elasticity of asphalts obtained with the known bitumeniferous binders are inadequate. These properties are determined by the elastic properties of the bitumen. An indication of failure is the appearance of deformed asphalt road surfaces. A need therefore continues to exist for an improved bitumeniferous binder.

SUMMARY OF THE INVENTION

Accordingly, one object of the present invention is to provide a polymer which, when used in bitumeniferous mixtures, markedly improves the elastic properties (measured, e.g., as elastic restoration) of bitumen preparations, while also meeting the necessary criteria satisfied by known additives, such as high thermal stability, oxidation resistance, easy incorporation, and compatibility.

Briefly, this object and other objects of the present invention as hereinafter will become more readily apparent can be attained in a polymer modified bitumen prepared by blending from 0.5 to 20 wt. % of a polymer material in bitumen, said polymeric additive being comprised of various polymers including from 20 to 100% of a polyalkyl methacrylate comprising monomer units as follows:

50-100 wt. % of alkyl (meth)acrylates containing alkyl groups of 8-26 C atoms;

0-30 wt. % of alkyl (meth)acrylates containing alkyl groups of 1-7 C atoms; and 0-20 wt. % of other monomers, optionally containing functional groups;

and said polymer has a molecular weight $M_w > 1,000,000$, corresponding to a viscosity number $\eta_{sp}/C \geq 120$ ml/g as measured in chloroform at 20° C.

DETAILED DESCRIPTION OF THE PREFERRED EMBODIMENTS

Surprisingly, it has now been found that polyalkyl (meth)acrylates of long chain alkyl esters, which polyalkyl (meth)acrylates have very high molecular weights, results in high elasticity of polymer-modified bitumen.

The polymer-modified bitumen of the present invention exhibits improved elastic restoration when an amount of 0.5–20 wt. % of polymer is incorporated in the bitumen. The polymeric additive, which may be comprised of various polymers, contains to the extent of 20–100 wt. % of a polyalkyl (meth)acrylate which is comprised of the following monomer units:

50–100 wt. % of alkyl (meth)acrylates in which the alkyl groups have 8–26 C atoms;

0–30 wt. % of alkyl (meth)acrylates in which the alkyl groups have 1–7 atoms; and 0–20 wt. % of other monomers, particularly monomers with functional groups. The polymer has a molecular weight $M_w > 1,000,000$, corresponding to a viscosity number $\eta_{sp}/C \geq 120$ ml/g (measured in chloroform at 20° C).

The polyalkyl (meth)acrylates can be added to the bitumen in solution form, e.g., in a suitable mineral oil, as aqueous emulsions, or in pure form.

As is known from the state of the art, the addition of polyalkyl (meth)acrylates having molecular weights in the range c. 50,000–1,000,000 can improve the cold flexibility of polymer-modified bitumen, as indicated by parameters of failure point and ductility. However, the elastic restoration is not adequately improved. The result is persistent deformation which occurs in, e.g., road surfaces, thereby presenting substantial risks to traffic safety.

For example, the specification of the technical Terms of Delivery for finished polymer-modified bitumen, "TL PmB 88, Teil 1", edition of Dec. 30, 1988, requires elastic restoration of at least 50% for various types of polymer-modified bitumen.

The Examples and Comparison Examples which follow illustrate the low elastic restoration exhibited when pure polyalkyl (meth)acrylates with molecular weights <1,000,000 are used, and the much higher restoration exhibited by the inventive PmBs. The monomer unit composition of the inventive polymer additives comprised of (meth)acrylate esters is responsible for the good thermal stability, oxidation resistance, and solubility, i.e., easy incorporatability in all types of bitumen.

The monomers used to prepare the polymer additive of the invention include alkyl (meth)acrylate copolymers of long-chain alkyl esters of acrylic and/or particularly methacrylic acid, with 8–26, advantageously 8–20, and particularly 10–18 C atoms in the alkyl moiety of the ester group. Examples of such (meth)acrylate esters are n-octyl methacrylate, 2-ethylhexyl acrylate, 2-ethylhexyl methacrylate, n-decyl methacrylate, isodecyl acrylate, isodecyl methacrylate, dodecyl methacrylate, octadecyl acrylate, octadecyl methacrylate, eicosyl methacrylate, and tricosyl methacrylate, wherewith the long-chain alcohols used to form the esters are preferably synthetic alcohols which generally are employed as mixtures of various alcohols in the 8–26 C-atom range. Such alcohols are familiar commercially, particularly under the trade names Lorol ®, Alfol ®, Dobanol ®, and Behenyl SR ®. An example of a technical alcohol useful for producing isodecyl methacrylate is a mixture of isomeric isodecyl alcohols with mean C-number $(\overline{C}) = 9.9$–$10.3$.

The bitumen-modifying polyalkyl (meth)acrylates are comprised of monomer units as follows:

50–100 wt. %, preferably 60–100 wt. %, particularly preferably 80–100 wt. %, of long chain alkyl esters of acrylic acid and/or preferably of methacrylic acid, which esters have 8–26 C atoms in the ester group. Preferably, the said esters may be mixtures of different $C_8$–$C_{26}$ alkyl esters.

In addition to these monomers which are essential to the invention, other monomers may be used to form the polyalkyl (meth)acrylates which particularly include:

i) acrylic acid esters and/or methacrylic acid esters, of alcohols which alcohols have 1–7 C atoms, e.g., methyl methacrylate, isobutyl methacrylate, n-butyl acrylate, isoamyl methacrylate, or n-hexyl acrylate, in amounts of 0–30 wt. %, particularly in amounts of 1–20 wt. %; and ii) other copolymerizable compounds, particularly compounds with functional groups, such as acrylic acid, methacrylic acid, maleic acid and maleic anhydride, N,N-dimethylaminoethyl methacrylate and quaternary derivatives of N,N-dimethylaminoethyl methacrylate, and N-vinylimidazole. Still other monomers include styrene, vinyl acetate, acrylonitrile, acrylamide, or methacrylamide, in amounts of 0–20 wt. %, particularly 0–10 wt. %.

The elastic-restoration-improving polymers can be incorporated into the bitumen in the form of solutions, particularly in a suitable mineral oil such as a higher viscous naphthenic lubricating oil, aqueous emulsions, and as the polymer per se.

The polyalkyl (meth)acrylates additive can be produced by customary techniques, viz. by principally radical polymerization of the monomers in solution or emulsion, or by mass polymerization (see Rauch-Puntigam, H., and Voelker, Th., 1967, "Acryl- und Methacrylverbindungen", pub. Springer-Verlag, Berlin, particularly pp. 203, 207, 230–33, 238, and 327). The molecular weight of the polyalkyl (meth)acrylates should be >1,000,000, particularly >1,050,000. The molecular weight is governed chiefly by the amount of the polymerization initiator employed in relation to the amount of the polymerizable monomers. The methods employed for controlling the molecular weight are known methods. The molecular weight Mw (g/mol of the polymer produced) is determined by the light scattering method ("Ullmanns Encyklopaedie der technischen Chemie", 4th Ed., Vol. 15, pp. 385–387). Viscosities are measured according to DIN 7745, using chloroform as a solvent, at 20° C.

To modify the bitumen according to the invention, the polyalkyl (meth)acrylates which have molecular weights of >1,000,000 are added to the bitumen of 0.5–20 wt. %, preferably 1–10 wt. %, and particularly preferably 2–8 wt. %. In addition to the polyalkyl (meth)acrylates, the present polymer-modified bitumen may contain other known polymeric compounds which are known as improvers for bitumeniferous binders and mixtures. Examples of these are polyolefins, e.g., polyethylene and polypropylene, ethylene/vinyl acetate copolymer, and acrylonitrile/butadiene/styrene copolymer.

The term "bitumen" as used in the context of the present invention includes all bitumens, tars, or asphalts which may be used as fillers, sealants, or coating compounds, in roadbuilding or roofing.

Having now generally described this invention, a further understanding can be obtained by reference to certain specific examples which are provided herein for purposes of illustration only and are not intended to be limiting unless otherwise specified.

EXAMPLE 1

Production of a poly-n-decyl methacrylate

A 160 g amount of n-decyl methacrylate and 40 g n-octane were charged into a 500-ml four-necked flask having an interior thermometer, a sickle-shaped stirrer, and a reflux condenser. The mixture was heated to 85° C. by means of an oil bath. After the 85° C. temperature was reached, nitrogen was passed through the mixture to degas the mixture, following which 0.32 g t-butyl peroctoate was added. After 70 min the mixture was thinned with 28.6 g n-octane, and after another 1 hr another 0.32 g of t-butyl peroctoate was added. After 16 hr total polymerization time, the polymethacrylate was precipitated by pouring the octane solution into ethanol, and was then dried. The resulting polymer product is characterized as follows:

i) $\eta_{sp}/C$ (in chloroform, at 20° C.)=160 ml/g
ii) Mw (measured by light scatterings)=1,700,000 g/mol,
iii) Conversion=99.5%

A 40 g amount of the polymer solution was added at 150° C. to 1,000 g of type B 200 bitumen. After stirring 1 hr in a round-bottom flask with a sickle-shaped stirrer at 150° C., the polymethacrylate was completely dissolved. The resulting polymer-modified bitumen (type "PmB 80") was homogeneous. The surface was glossy after cooling.

EXAMPLE 2

Production of a polyisodecyl methacrylate

A 255 g amount of isodecyl methacrylate and 45 g p-xylene were charged into a 1-liter four-necked flask, and the mixture was heated to 65° C. Then nitrogen was passed through the mixture to degas the mixture, following which 0.51 g of t-butyl perpivalate was added. After 1 hr the mixture was thinned with 45 g xylene, and after another 4 hr another 0.51 g of t-butyl perpivalate was added, along with 0.26 g dodecyl mercaptan. After 14 hr total polymerization time, the polymerization was terminated. The polymethacrylate was precipitated by pouring into ethanol, and was then dried. The resulting polymer product is characterized as follows:

i) $\eta_{sp}/C$ (in chloroform, at 20° C.)=120 ml/g,
ii) Mw (measured by light scattering)=1,050,000 g/mol,
iii) Conversion=97.6%.

A 40 g amount of the isolated polymethacrylate was dissolved in 1,000 g of B 200, as in Example 1. As in Example 1 a homogeneous polymer-modified bitumen (type "PmB 80") was obtained.

EXAMPLE 3

Production of a poly($C_{12}$–$C_{15}$) methacrylate

A 206.4 g amount of a $C_{12}$–$C_{15}$ methacrylate (8 wt. % of n—$C_{12}$, 13.2 wt. % of n—$C_{13}$, 12.0 wt. % of n—$C_{14}$, 6.8 wt. % of n—$C_{15}$, and 60 wt. % of iso-$C_{12}$–$C_{15}$), 3.6 g methyl methacrylate, and 90 g of n-octane were heated to 85° C. After nitrogen was passed through the mixture for 1 hr, 0.42 g of t-butyl peroctoate was added. After 4 hr another 0.42 g of t-butyl peroctoate was added. The total polymerization time was 16 hr. The polymer was then isolated by pouring the octane solution into ethanol, and was dried. The resulting polymer product is characterized as follows:

i) $\eta_{sp}/C$ (in chloroform, at 20° C.)=120 ml/g
ii) Mw (measured by light scattering)=1,080,000 g/mol
iii) Conversion=99.6%

A 45 g amount of the isolated polymer was dissolved in 55 g of a naphthenic lubricating oil having a viscosity of 9 sq mm/sec (measured at 100° C.).

The oil solution had a viscosity of 5,540 mPa-sec at 150° C. A 88.9 g amount of this oil solution was added to 1,000 g of a B 200 bitumen at 150° C. and was dissolved in the bitumen by stirring 1 hr at 150° C. The result was a homogeneous polymer-modified bitumen of type "PmB 80".

EXAMPLE 4

Production of a polyisodecyl methacrylate

Into a 4-liter four-necked flask equipped with a stirring means, interior thermometer, and reflux condenser, 350 g of water, 4.5 g of a 10% aqueous solution of the Na salt of a paraffin sulfonate having 15 C atoms, and 0.13 g ammonium peroxydisulfate were added.

After the mixture was heated to 80° C., a mixture of 600 g of isodecyl methacrylate, 478.2 g of water, and 90 g of 10% Na—$C_{15}$-paraffin sulfonate was added dropwise over a period of 3 hr. After the ingredients were added, the mixture was stirred an additional 20 hr. at 80° C., with three additions of an additional 0.09 g each of ammonium peroxydisulfate, at intervals of 6.5 hr.

The resulting polymer emulsion had a viscosity of 660 mPa-sec. The dry matter content was determined to be 38.5%. The resulting polymer product is characterized as follows:

i) $\eta_{sp}/C$ (chloroform, at 20° C.)=220 ml/g
ii) Mw (by light scattering)=5,200,000 g/mol 77.9 g of the emulsion was added to 1,000 g "B 80" bitumen at 80° C. The mixture was heated slowly to 150° C., with stirring with a sickle-shaped stirrer. After stirring 1 hr, all of the water was evaporated. A homogeneous polymer-modified bitumen of type "PmB 65" was obtained.

EXAMPLE 5

The polymethacrylate from the emulsion of Example 4 was isolated by distilling off the water, dissolving the residue in tetrahydrofuran, and precipitating the polymer by pouring the polymer containing solution into ethanol. Then 35 g of the dried polymer was dissolved in 65 g of a naphthenic lubricating oil (viscosity 9 sq mm/sec at 100° C.), at 150° C.

A 85.7 g amount of this solution was added to 1,000 g "B 80" bitumen, with dissolution by stirring 2 hr at 150° C. A homogeneous type "PmB 65" polymer-modified bitumen was obtained.

COMPARISON EXAMPLE 1

Production of a polyisodecyl methacrylate with molecular weight lower than that according to the invention The procedure followed was that described in Example 1, except that isodecyl methacrylate was used and the thinning with 28.6 g n-octane was carried out after 2 hr (rather than 70 min). After an additional 1 hr, 0.32 g of t-butyl peroctoate was added. After 16 hr total polymerization time, the polymethacrylate was isolated by pouring the polymer containing solution into ethanol, and was then dried. The resulting polymer product is characterized as follows:

i) $\eta_{sp}/C = 90$ ml/g
ii) Mw (measured by light scattering) = 710,000 g/mol A homogeneous polymer-modified bitumen was obtained as in Example 1, by dissolving 40 g of the polymer in 960 g B 200.

COMPARISON EXAMPLE 2

Production of a polyisodecyl methacrylate with molecular weight lower than that according to the invention A 15 g amount of naphthenic lubricating oil (viscosity 11.5 sq mm/sec at 100° C.) and 85 g of isodecyl methacrylate were charged into a 500-ml four-necked flask, and the mixture was heated to 82° C. Then nitrogen was passed through the mixture for 0.5 hr, and 0.17 g of t-butyl peroctoate was added. A mixture of 45 g of naphthenic oil, 255 g of isodecyl methacrylate, and 0.5 g of t-butyl peroctoate was added gradually over 3 hr by means of a dosing pump. 20 min after the end of the ingredient addition, the resulting mixture was thinned with 280 g of naphthenic oil, and after an additional 100 min another 0.5 g of t-butyl peroctoate was added. After 16 hr the polymerization was terminated. The viscosity of the solution was 4,560 mPa.sec at 150° C. The resulting polymer product is characterized as follows:

i) $\eta_{sp}/C = $ (chloroform, 20° C.) = 88 ml/g,
ii) Mw (by light scattering) = 695,000 g/mol.

A 80 g amount of the solution was added to 1,000 g "B 200" bitumen at 150° C.

COMPARISON EXAMPLE 3

Production of a polyisodecyl methacrylate with molecular weight lower than that according to the invention Analogously to Example 1, 222 g of isodecyl methacrylate, 3 g of methyl methacrylate, and 275 g of n-octane were charged to the reaction vessel, the mixture was heated to 85° C., and degassing was accomplished by addition of dry ice. Then 0.45 g t-butyl peroctoate was added to the mixture. After 3 hr an additional 0.45 g of t-butyl peroctoate was added. The total polymerization time was 16 hr. The polymer was isolated by pouring the polymer containing solution into ethanol, and was then dried. The resulting polymer product is characterized as follows:

i) $\eta_{sp}/C = $ (chloroform, 20° C.) = 55 ml/g
ii) Mw (by light scattering) = 340,000 g/mol A 60 g amount of the isolated polymethacrylate was dissolved in 1,000 g "B 80" bitumen at 150° C., by stirring for 1 hr.

TABLE 1

| | Viscosity $\eta_{sp}/c$ of Polymer | SP °C. | Pene 0.1 mm | Failure Point °C. | Ductility (cm) 25° C. | 13° C. | 7° C. | Elastic Restoration |
|---|---|---|---|---|---|---|---|---|
| Examples [using various polymers and bitumen formulations] | | | | | | | | |
| Example 1 | 160 | 45 | 145 | −30 | | >100 | >100 | 70% |
| Example 2 | 120 | 45 | 141 | −25 | | | >100 | 49–51% |
| Example 3 | 120 | 39 | 220 | −35 | | | >100 | 50–55% |
| Example 4 | 220 | 50 | 81 | −17 | >100 | | | 50% |
| Example 5 | 220 | 44 | 141 | −20 | >100 | | | 60% |
| Comparative Example 1 | 90 | 43 | 132 | −29 | | | >100 | 25% |
| Comparative Example 2 | 88 | 47 | 105 | −27 | >100 | | | 35% |
| Comparative Example 3 | 55 | 51 | 74 | −17 | >100 | | | 11% |
| Bitumen Type | | | | | | | | |
| B 200 | | 39 | 190 | −18 | >100 | | | 0% |
| B 80 | | 49 | 88 | −16 | >100 | | | 1% |

SP = Softening Point, Ring und Kugel, DIN 52011
Pene = Penetration (Needle Point), DIN 52010
Failure Point (Fraas), DIN 52012
Ductility, DIN 52013

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A polymer-modified bitumen (PmB) having improved elastic restoration prepared by blending from 0.5–20 wt. % of a polymer material in bitumen, said polymer additive, which may be comprised of various polymers, being comprised of from 20–100wt. % of a polyalkyl (meth)acrylate comprising monomer units as follows:

50–100 wt. % of alkyl (meth)acrylates containing alkyl groups of 8–26 C atoms;

0–30 wt. % of alkyl (meth)acrylates containing alkyl groups of 1–7 C atoms; and

0–20 wt. % of other monomers, optionally containing functional groups;

and said polymer having a molecular weight Mw > 1,000,000, corresponding to a viscosity number $\eta_{sp}/C > 120$ ml/g as measured in chloroform at 20° C.

2. The polymer-modified bitumen according to claim 1, wherein the polyalkyl (meth)acrylate is comprised of 50–100 wt. % of alkyl (meth)acrylate monomer units with the alkyl groups having 8–18 C atoms.

3. The polymer-modified bitumen according to claim 1, wherein the polymer additive is comprised exclusively of polyalkyl (meth)acrylate.

4. The polymer-modified bitumen according to claim 2, wherein the polymer additive is comprised exclusively of polyalkyl (meth)acrylate.

5. The polymer-modified bitumen according to claim 1, wherein the elastic restoration is at least 50 percent.

6. The polymer modified bitumen according to claim 1, wherein said polyalkyl (meth)acrylate is comprised of monomer units of:

60–100 wt. % alkyl (meth)acrylate whose alkyl group contains 8–26 C atoms;

1–20 wt. % of alkyl (meth)acrylate whose alkyl group contains 1–7 C atoms; and

0–10 wt. % of other monomers.

* * * * *